United States Patent Office 3,212,281
Patented Oct. 19, 1965

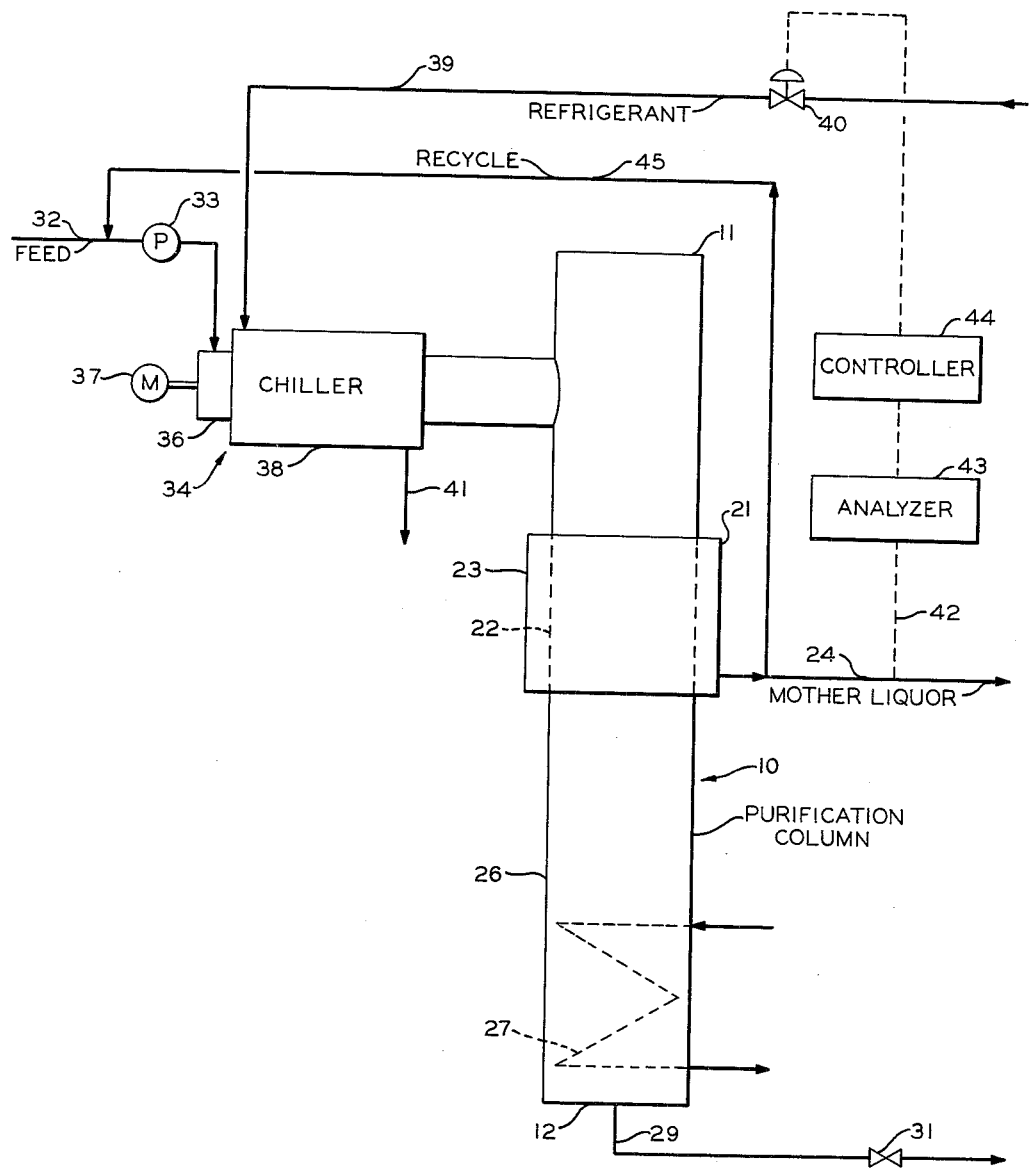

3,212,281
FRACTIONAL CRYSTALLIZATION
Dwight L. McKay, Bartlesville, Okla., assignor to Phillips Petroleum Company, a corporation of Delaware
Filed Dec. 6, 1961, Ser. No. 157,375
12 Claims. (Cl. 62—58)

This invention relates to the separation of multi-component mixtures. In one aspect the invention relates to the separation and purification of components of liquid multi-component mixtures. In another aspect the invention relates to controlling the solids content of a crystal slurry supplied to a purification column of a fractional crystallization apparatus.

The separation of chemical compounds by means of crystallization finds many applications in industrial installations. While many separations can be made by distillation or solvent extraction, there are cases where these methods are either impractical or impossible and a desired separation can be effected more advantageously by means of crystallization. Thus, in the case of chemical isomers having similar boiling points and solubilities, or materials having relatively high boiling ranges, or thermally unstable substances, separation by crystallization may be the only method which can be advantageously employed.

As well as offering in many cases, perhaps, the only practical method of separation the crystallization method offers the further advantage of being the only known separation method which in the case of eutectic-forming systems theoretically produces a pure product in a single stage of operation. In actual practice, however, the crystals obtained from a solution of several components will be impure because of the occlusion of mother liquor within the crysal interstices. In the conventional fractional crystallization processes the crysal yield from one batch crystallization is redissolved in a solvent or remelted and again crystallized to effect further purification. The recrystallized product will have less impurities since the concentration of an impurity in the new liquor is less than in the previous liquor crystallization. Such processes require a large amount of equipment and floor space for their operation with resulting high operating expenditures in terms of labor and equipment costs. Furthermore in these types of processes purity of the product is limited by the number of stages through which the process is carried.

More recently a continuous method of separating and purifying liquid multi-component mixtures has been advanced which overcomes the disadvantages of conventional fractional crystallization processes. This method involves cooling a liquid multi-component mixture from which the separation is to be made so as to form crystals of at least one component and thereafter supplying the resulting slurry to a crystal separation and purification column. In this column crystals are separated from mother liquor and then introduced into a purification section containing a melting section. The crystals are moved through the purification section toward the melting section where the crystals are melted and a portion of the melt is withdrawn as product. The remainder of the melt is displaced countercurrently to the movement of crystals and in intimate contact therewith so as to remove occluded impurities.

When practicing crystal separation and purification it has been found desirable to supply to the separation and purification means a slurry which has a substantially constant solids content. When operating in this manner the production of high purity products in high yields is greatly facilitated. It also makes possible a steady operating procedure in which fluctuations in product yield and product purity are reduced to a minimum. Furthermore when practicing the above described method, it is often desirable to maintain a solids content of the slurry as high as possible while still producing a slurry which is capable of flowing. In order to maintain a high solids content slurry close control over the refrigeration process, whereby the solids are formed, is required. Several methods have been advanced for controlling the operation of the crystal forming means so as to provide a slurry having a constant solids content. One method proposes controlling the refrigeration requirements in accordance with the temperature of the slurry. However, this method has not proven entirely satisfactory, particularly in systems in which there are large changes in solids content with small changes in temperature.

It is an object of the invention to provide an improved fractional crystallization method and apparatus.

Another object of the invention is to provide an improved process and apparatus for the separation of components of multi-component mixtures.

Still another object of the invention is to provide improved method and apparatus for controlling the solids content of a crystal slurry.

Still another object of the invention is to provide an improved method and apparatus for controlling the solids content of a crystal slurry being introduced into a crystal purification apparatus.

Still another object of the invention is to provide an improved method and apparatus for controlling the refrigeration requirements of a fractional crystallization apparatus.

Other objects, aspects and the several advantages of the invention will become apparent to one skilled in the art upon consideration of the accompanying disclosure, claims and drawing.

Broadly speaking, the invention is concerned with a process wherein a multi-component mixture is cooled to form a slurry of solids and mother liquor and the mother liquor is separated from said slurry. The above described objects are broadly accomplished by the improvement comprising the concentration of at least one component of said mother liquor, said component's concentration being a function of the solids' concentration in said slurry, and adjusting said cooling in response to said determination so as to regulate the solids' concentration of said slurry.

In another aspect of the invention the improvement resides in determining the ratio of at least two of the components of said mother liquor, said ratio being a function of the solids concentration in said slurry, and adjusting said cooling in response to said determination so as to regulate the solids concentration of said slurry.

The invention is particularly advantageous in a process which comprises passing said slurry of solids in mother liquor into a purification zone, separating the mother liquor from the slurry within the purification zone, moving the solids through the purification zone toward a melting zone, melting solids in said melting zone, displacing a portion of the resulting melt into the moving solids, recovering a purified product from the melting zone, and controlling as hereinbefore described the solids content of the slurry entering said purification zone.

It has now been discovered that determining the concentration of at least one component in said mother liquor stream and adjusting the amount of cooling in said chiller responsive to said determination provides an improved method for controlling the quality of the product.

The process and apparatus described herein can be advantageously employed in conjunction with practically any system to which fractional crystallization is applicable. For simplification the invention is described herein primarily with reference to the concentration of beer; however, the process and apparatus of the invention are applicable to a vast number of simple binary and complex multi-component systems. The invention is particularly applicable to the separation of hydrocarbons which have practically the same boiling point and are, therefore, difficult to separate by distillation. Where high-boiling organic compounds are concerned, separation by distillation is often undesirable because many such compounds are unstable at high temperatures. One particularly advantageous application of the process and apparatus lies in its use with systems which exhibit large changes in solids content with small changes in temperature, such as with a mixture containing 85 mol percent or more 2-methyl-5-vinylpyridine with normal paraffins or with a system containing a high percentage of water. In order to illustrate some of the systems to which the invention is applicable the following compounds are grouped with respect to their boiling points.

| Group A | B.P., °C. | F.P., °C. |
| --- | --- | --- |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 | |
| Methyl ethyl ketone | 79.6 | −86.4 |
| Methyl propionate | 79.9 | −87.5 |
| Methyl acrylate | 80.5 | |
| 1,3-cyclohexadiene | 80.5 | −98 |
| 2,4-dimethylpentane | 80.8 | −123.4 |
| 2,2,3-trimethylbutane | 80.9 | −25 |
| Cyclohexane | 81.4 | 6.5 |
| Acetonitrile | 82 | −42 |
| Cyclohexene | 83 | −103.7 |
| 2-methylhexane | 90 | −119 |
| 3-methylhexane | 89.4 | −119.4 |

| Group B | B.P., °C. | F.P., °C. |
| --- | --- | --- |
| Methyl cyclohexane | 100.3 | −126.3 |
| Cyclohexane | 81.4 | 6.5 |
| n-Heptane | 98.52 | −90.5 |
| 2,2,4-trimethylpentane (isooctane) | 99.3 | −107.4 |
| Nitromethane | 101 | −29 |
| p-Dioxane | 101.5 | 11.7 |
| 2-pentanone | 101.7 | −77.8 |
| 2-methyl-2-butanol | 101.8 | −11.9 |
| 2,3-dimethylpentane | 89.4 | |
| 3-ethylpentane | 93.3 | −94.5 |

| Group C | B.P., °C. | F.P., °C. |
| --- | --- | --- |
| Toluene | 110.8 | −95 |
| Methylcyclohexane | 100.3 | −126.3 |
| 2,2,3,3,-tetramethyl butane | 106.8 | 104 |
| 2,5-dimethylhexane | 108.25 | −91 |
| 2,4-dimethylhexane | 110 | |
| 2,3-dimethylhexane | 113.9 | |
| 3,4-dimethylhexane | 116.5 | |
| 3-ethyl-2-methylpentane | 114 | |
| 3-ethyl-2-methylpentane | 119 | |

| Group D | B.P., °C. | F.P., °C. |
| --- | --- | --- |
| Aniline | 184.4 | −6.2 |
| Toluene | 110.8 | −95 |
| Benzene | 80.0 | 5.5 |

| Group E | B.P., °C. | F.P., °C. |
| --- | --- | --- |
| Carbon tetrachloride | 77 | −22.8 |
| Chloroform | 61 | −63.5 |
| CS₂ | 46.3 | −108.6 |
| Acetone | 56.5 | −95 |

| Group F | B.P., °C. | F.P., °C. |
| --- | --- | --- |
| Ortho-xylene | 144 | −27.1 |
| Meta-xylene | 138.8 | −47.4 |
| Para-xylene | 138.5 | 13.2 |

| Group G | B.P., °C. | F.P., °C. |
| --- | --- | --- |
| Ortho-cymene | 175.0 | −73.5 |
| Meta-cymene | 175.7 | −25 |
| Para-cymene | 176.0 | −73.5 |

| Group H | B.P., °C. | F.P., °C. |
| --- | --- | --- |
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | M.P., °C. |
| --- | --- | --- |
| Ortho-nitrotoluene | 222.3 | −10.6 / −4.1 |
| Meta-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups. For example, benzene can be separated from a benzene-n-hexane or a benzene-n-heptane mixture in which the benzene is present in an amount greater than the eutectic concentration. In the same manner, para-xylene may be readily separated from a mixture of para- and meta-xylenes or from para-, meta-, or ortho-xylenes. Benzene can also be separated from a mixture thereof with toluene and/or analine. Multi-component mixtures which can be effectively resolved so as to recover one or more of the components in substanially pure form include mixtures of at least two of 2,2-dimethylpentane, 2,4-dimethylpentane, and mixtures of at least two of carbon tetrachloride, chloroform, and acetone. The invention is also applicable to the separation of individual components from a system of cymenes.

This invention can also be utilized to purify naphthalene, hydroquinone (1,4-benzenediol), paracresol, para-dichlorobenzene, and such materials as high melting waxes, fatty acids, and high molecular weight normal paraffins. The invention can also be used to resolve a mixture comprising anthracene, penanthrene, and carbazole. Furthermore, the invention can be used to separate durene (1,2,4,5-tetramethylbenzene) from $C_{10}$ aromatics.

It is not intended however to limit the invention to organic mixtures but rather it is applicable to inorganic mixtures as well and offers a practical method of separating two inorganic components between which solvates or hydrates are formed. Examples of inorganic systems to which this invention is particularly applicable are those for the recovery of pure salts such as ammonium nitrate and of anhydrous salts from their hydrates.

In certain instances it is particularly desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process and apparatus of this invention, water can be removed from fruit juices such as grape, orange, lemon, pineapple, apple and tomato. It is also possible to concentrate vegetable juices and beverages such as milk, beer, wine, coffee and tea by this method. The desired degree of concentration can be closely controlled by varying the amount of solids formed in the chiller. This aspect of the invention is generally applicable in those instances where it is desired to increase the concentration of a solution by removing at least a portion of a solid therefrom.

For a more complete understanding of the invention reference is now made to the following description and to the drawing which is an elevational view of an illustrative fractional crystallization apparatus of the present invention.

Referring to the drawing an elongated crystal purification column 10 is closed at its upper and lower ends by closure members 11 and 12 respectively. Filter section 21 disposed in an intermediate portion of column 10 comprises a filter medium such as a filter screen 22 surrounded by jacket 23. Jacket 23 has a line 24 connected thereto for the withdrawal of liquid from the filter section. In the case of the concentration of beer the product is removed as the mother liquor stream through line 24. Some of the mother liquor may be recycled to feed line 32 through conduit 45. The portion of column 10 below filter section 21 and in communication therewith comprises a purification section 26. The heat exchange means is positioned in the lower end of column 10 in order to provide a crystal melting section in that end of the column. As illustrated the heat exchange means is a coil 27 through which a heat transfer medium is circulated. However, it is not intended to limit the invention to the specific heating means shown for other suitable means can be employed. For example, an electrical heater may be positioned next to closure member 12, a coil may be disposed around column 10, or an electrical bayonette type heater may be provided to extend into the end of the column. Hot liquid or vapor may also be injected into the column in order to melt the crystals. A liquid outlet line 29 provided with a valve 31 is connected to the end of column 10 to provide means for the removal of melt from the melting section.

Feed line 32 leading from a source of feed material and containing pump 33 is connected to the inlet end of chiller 34. Chiller 34 can be any conventional type of refrigerating or crystal forming means such as a scraped-surface chiller. As illustrated, the chiller comprises a cylindrical member 36 having positioned therein means for moving crystal slurry formed therein through the chiller such as an auger connected to a motor 37. The cylindrical member is closed at its outer end while its other end is connected to column 10 at a point above filter section 21. Cylindrical member 36 is encompassed by a jacket 38 through which a coolant such as a brine solution or refrigerant is continuously passed by means of inlet 39 and outlet line 41 connected to the jacket. Line 39 contains a flow control means such as motor value 40 to provide means for controlling the rate at which cooling is introduced to the jacket. It is also within the scope of the invention to position this valve at outlet 41. Obviously, it is within the scope of the invention to use any type of coolant desirable to cool the multi-component mixture to the necessary level. For instance, when cooling beer to increase the concentration, it is frequently desirable to use ammonia. Thus when the desired refrigeration is accomplished by the evaporation of a normally gaseous material, such as propane or Freon, valve 40 is positioned in line 41 to provide means for controlling the rate of evaporation.

In the operation of the apparatus a liquid feed which may be a liquid multi-component mixture containing components of different melting points is pumped from a source not shown by pump 33 into chiller 34. Chiller 34 is maintained at a temperature sufficiently low to crystallize a portion of one of the components and form a slurry of crystals in mother liquor. This is accomplished by circulating a suitable coolant through jacket 38 by means of inlet 39 and outlet 41. As discussed hereinbefore, it has been found that for improved operation of a crystal purification apparatus it is important to provide a crystal slurry having a predetermined solids content. In accordance with the method of this invention the solids content of the chiller is determined indirectly by determining the concentration of at least one of the components of the mother liquor stream 24. Preferably, a ratio of at least two of the components' concentration of said mother liquor stream is determined and said ratio is employed to adjust the amount of cooling provided said chiller. For instance in the operation of the chiller 34 and the purification column 10 for the concentration of beer, it is satisfactory to determine the concentration of alcohol in the mother liquor stream 24, or more preferably the water-alcohol ratio. If said ratio, or said concentration, varies from a predetermined range the amount of cooling is adjusted accordingly.

The concentration of the components or the ratio of the components can be determined by any suitable means, such as chromatographically or by the determination of the refractive index. A suitable chromatograph is described in Instrument Society of America, May 1956, page 76. A suitable instrument for determining refractive index is described in Industrial and Engineering Chemistry, vol. 48, No. 6, pages 1027–1030 and in Consolidated Electrodynamics Corporation Bulletin 1839.

The amount of cooling may be adjusted by the method of this invention to control the solids content within any desired range or to maintain the solids content of the slurry substantially constant. For example in the concentration of beer to a concentrate having approximately 30 percent of the volume of the unconcentrated beer it is preferred that the solids content entering the crystal purification column be within the range of 20 to 50 weight percent, more preferably 30 to 45 weight percent. The alcohol content of the mother liquor stream should be in the range 5 to 20 weight percent, preferably 10 to 15 weight percent. The water to alcohol weight ratio in the mother liquor stream should be in the range of 3 to 18, more preferably 4 to 8.

If the concentration of the component being measured varies or if the ratio of the components being determined by analyzer 43 should vary the controller 44 operates so as to adjust valve 40 thereby altering the rate of flow of coolant through the chiller jacket. For example, if the determination indicates a decrease in the solids content, valve 40 is opened by a preselected amount thereby increasing the coolant circulation rate. Conversely, if there is indicated an increase in the solids content of the slurry, valve 40 is closed by a preselected amount so as to decrease the coolant circulation rate.

By proceeding as described hereinbefore it is possible to supply a slurry having a desired constant solids content to the upper end of purification column 10. Upon introduction into column 10 the slurry is moved downward by any suitable means. Within filter section 21 mother liquor is separated from the crystals removed from the column through line 24. The crystals thereafter continue their movement as a uniform mass downwardly through the column. Crystals, upon approaching the end of column 10, enter the melting zone maintained in the end of the column by heating means 27. The melting zone is maintained at a temperature at least as high as the melting point of the crystals by continuously circulating the heat exchange medium through the coil of a heating means. On reaching the melting zone at least a portion of the crystals are melted and a portion of the resulting melt is displaced upwardly as a reflux stream into the downwardly moving mass of crystals. The reflux stream on contacting the crystals displaces occluded impurities from the crystals by refreezing thereon. Melted material is withdrawn from the melting zone through line 29. In the case of a beverage such as beer etc. the concentrate is removed through outlet 24 and nearly pure water from the bottom of the column.

While the instant invention has been described in conjunction with a particular crystal purification column it is not intended to so limit the invention. Indeed the invention is operable when no crystal purification column is utilized at all. For example, it may be desirable to control the amount of chilling obtained in the crystallizer with the mother liquor and crystals ejected therefrom not being further purified but merely separated.

This invention is broadly applicable to any purification column which utilizes a displaced reflux stream to obtain a high purity product. Suitable types of crystal purification apparatus with which the invention is particularly advantageously employed are described in U.S. Patent No. 2,854,494, filed by R. W. Thomas March 17, 1955 and issued September 30, 1958, and Joachem Schmidt, Re. 23,810, reissue of Patent No. 2,617,274.

Furthermore, while the apparatus of FIGURE 1 has for the sake of clarity and understanding been illustrated and described as occupying a substantially vertical position, it is not intended to so limit the invention. It is understood that the apparatus can be otherwise disposed without departing from the spirit and scope of the invention. Thus the separation and purification column can be positioned horizontally or the column can be operated vertically with the melting zone in the top of the column rather than in the bottom as illustrated.

A more comprehensive understanding of the invention may be obtained by reference to the following illustrative examples.

Example I

Beer containing 3.5 weight percent alcohol, 6.5 weight percent sugar, etc. and 90% water is cooled in chiller 38 to a temperature of about 26.5° F. to yield a slurry at the chiller outlet containing 65 pounds per hundred pounds of feed of concentrate and 35 pounds of approximately pure water crystals. The concentrate contains 3.5 pounds of alcohol, 6.5 pounds of sugar, etc. and 55 pounds of water per 100 pounds of feed. Thus, the alcohol concentration is 5.4 weight percent and the water to alcohol ratio is 15.7. If the chiller warms slightly so that there is only 30 pounds of ice formed per hundred pounds of feed, the alcohol concentration decreases to 5.0 weight percent and the water to alcohol ratio increases to 17.1. Of course, a similar relation exists for sugar and sugar to water or sugar to alcohol ratio. This change in alcohol concentration and water to alcohol ratio is easily detected by a chromatograph which in turn emits a signal which actuates a controller 44 to reset the refrigerant pressure to lower the temperature and bring the crystal slurry composition back to the desired 35 weight percent ice. Corrective action then ceases. The 5.4 weight percent beer thus produced is concentrated to 8 percent in a similar second stage, and then to 12.5 percent in a third stage to obtain the final beer concentrate. The solids concentration leaving the second and third stage chillers is controlled as described for the first stage.

Example II

An alternate method of producing a 12.5 weight percent beer concentrate consists in using a single stage with recycling of the motor liquor to the chiller feed. Single strength beer containing 3.5 weight percent alcohol and 6.5 percent sugar is blended with an equal quantity of recycle mother liquor containing 12.5 weight percent alcohol to produce a feed blend to the chiller containing 8 percent alcohol. This is cooled to 18° F. to form a slurry containing 35 percent solids. The slurry is fed to a crystal purification column from which is removed pure water and 12.5 weight percent alcohol as the mother liquor. A portion of the mother liquor is recycled. Water alcohol ratio in mother liquor is 5 to 1 since the sugar has increased to 23 weight percent.

While certain examples, structures, compositions, and process steps have been described for purposes of illustration, the invention is not limited to these. Variations of the application within the scope of the disclosure and the claims can readily be effected by those skilled in the art.

I claim:

1. In a process which comprises cooling a multi-component mixture to form a slurry of solids in mother liquor and separating mother liquor from said slurry, the improvement comprising determining the concentration of at least one component of said mother liquor after being separated from said slurry, said component's concentration being a function of the solids concentration in said slurry, and adjusting said cooling in response to said determination so as to regulate the solids concentration of said slurry.

2. In a process which comprises cooling a multi-component mixture to form a slurry of solids in mother liquor and separating mother liquor from said slurry, the improvement comprising determining the ratio of the concentration of at least two of the components of said mother liquor after being seperated from said slurry, said ratio being a function of the solids concentration in said slurry, and adjusting said cooling in response to said determination so as to regulate the solids concentration of said slurry.

3. In a process which comprises cooling a multi-component mixture to form a slurry of solids in mother liquor, passing said slurry of solids in mother liquor into a purification zone, separating mother liquor from said slurry within said purification zone, purifying said solids within said purification zone and recovering a purified product from said zone, the improvement comprising determining the concentration of at least one component of said mother liquor after being separated from said slurry, said component's concentration being a function of the solids concentration in said slurry, and adjusting said cooling in response to said determination so as to regulate the solids concentration of said slurry.

4. In a process which comprises cooling a multi-component mixture to form a slurry of solids in mother liquor, passing said slurry of solids in mother liquor into a purification zone, separating mother liquor from said slurry within said purification zone, purifying said solids therein and recovering a purified product therefrom, the improvement comprising determining the ratio of the concentration of at least two of the components of said mother liquor after being separated from said slurry, said ratio being a function of the solids concentration in said slurry, and adjusting said cooling in response to said determination so as to regulate the solids concentration of said slurry.

5. The process of claim 4 wherein said mixture comprises beer and said ratio comprises the ratio of water to alcohol in said mother liquor.

6. In a process which comprises cooling a liquid multi-component mixture to form a slurry of solids in mother liquor, passing said slurry of solids in mother liquor into a purification zone, separating mother liquor from said slurry within said purification zone, moving solids through said purification zone toward a melting zone, melting solids in said melting zone, displacing a portion of the resulting melt into said moving solids, and recovering a purified product from said melting zone, the improvement comprising determining the ratio of the concentration of at least two of the components of said mother liquor stream after being separated from said slurry, said ratio being a function of the solids concentration in said slurry, and adjusting said cooling in response to said determination so as to regulate the solids concentration of said slurry.

7. The process of claim 8 wherein said mixture comprises beer and said ratio comprises the ratio of the concentration of water to alcohol in said mother liquor.

8. In a process which comprises introducing into a cooling zone a liquid multi-component mixture containing one component which crystallizes first on cooling of said mixture, circulating a cooling medium through said cooling zone in indirect heat exchange with said mixture thereby forming a slurry of crystals of said component in mother liquor, passing said slurry into a purification zone, separating mother liquor from said slurry within said purification zone, moving crystals through said purification zone toward the melting zone, melting crystals in said melting zone, displacing a portion of the resulting melt into said moving crystals, and recovering a purified product from said melting zone, the improvement comprising determining the ratio of the concentration of at least two of the components of said mother liquor stream after being separated from said slurry, said ratio being a function of the solids concentration in said slurry, and adjusting said cooling in response to said determination so as to regulate the solids concentration of said slurry.

9. In a process which comprises introducing beer into a cooling zone, circulating a cooling medium through said cooling zone in indirect heat exchange with said mixture, thereby forming a slurry of ice crystals in a mother liquor concentrated in beer, passing said slurry into a purification zone, separating said beer concentrate from said slurry within said purification zone, moving crystals through said purification zone toward a melting zone, melting crystals in said melting zone, displacing a portion of the resulting melt into said moving crystals, and recovering a purified product from said melting zone, the improvement comprising determining the ratio of the concentration of water to alcohol in said beer concentrate after being separated from said slurry and adjusting said cooling in response to said determination so as to regulate the solids content of said slurry.

10. In fractional crystallization apparatus including a crystallization chamber with a feed inlet means, crystal slurry outlet means, means for cooling said crystallization chamber and means for separating said crystals from the mother liquor having a crystal outlet means and a mother liquor outlet means, the improvement comprising means for adjusting said cooling means, means for determining the concentration of at least one component in said mother liquor outlet means, and control means operatively connected to said means for adjusting and said means for determining concentration, said control means serving to actuate said adjusting means in response to a signal from said determining means so as to regulate the solids content in said slurry.

11. In fractional crystallization apparatus including a crystallization chamber with feed inlet means, crystal slurry outlet means, means for cooling said crystallization chamber and means for separating said crystals from the mother liquor having a crystal outlet means and a mother liquor outlet means, the improvement comprising means for adjusting said cooling means, means for determining the ratio of the concentration of at least two components in said mother liquor outlet means, and control means operatively connected to said means for adjusting and said means for determining the ratio of the concentration of at least two components in said mother liquor outlet means, said control means serving to actuate said adjusting means in response to a signal from said determining means so as to regulate the solids content in said slurry.

12. In a fractional crystallization apparatus comprising in combination an elongated purification column, means for melting crystals associated with one end of said column, conduit means for withdrawing product therefrom, crystal forming means having fluid inlet means and fluid outlet means connected thereto, feed inlet means connected to said crystal forming means, slurry withdrawal means connected to said crystal forming means and to the end portion of said column opposite from that with which said crystal melting means is associated, and filtering means in said column between said crystal melting means and the point of connection between said slurry withdrawal means to said column, the improvement comprising means for adjusting said cooling means, means for determining the ratio of the concentration of at least two components in said mother liquor outlet means and control means operatively connected to said means for adjusting and said means for determining concentration, said control means serving to actuate said adjusting means in response to a signal from said determining means so as to maintain said solids content substantially constant in said slurry.

References Cited by the Examiner
UNITED STATES PATENTS

| | | |
|---|---|---|
| 2,413,208 | 12/46 | Barnes. |
| 2,421,854 | 6/47 | Seaman. |
| 2,427,996 | 9/47 | Seaman. |
| 2,569,127 | 9/51 | Eltenton. |
| 2,750,433 | 6/56 | Tourneau et al. _____ 62—124 X |
| 2,807,976 | 10/57 | Vossberg. |
| 2,940,272 | 6/60 | Croley _____ 62—124 X |
| 2,997,856 | 8/61 | Pike _____ 62—58 |
| 3,012,409 | 12/61 | Ashley _____ 62—58 |
| 3,093,649 | 6/63 | Ratje. |

NORMAN YUDKOFF, *Primary Examiner.*

ROBERT A. O'LEARY, *Examiner.*